United States Patent
Zhu

(10) Patent No.: US 12,379,045 B2
(45) Date of Patent: Aug. 5, 2025

(54) TEMPERATURE CONTROL REGULATING VALVE AND APPLICATION THEREOF

(71) Applicant: SUZHOU FUERDA TECHNOLOGY CO., LTD., Suzhou (CN)

(72) Inventor: Like Zhu, Suzhou (CN)

(73) Assignee: SUZHOU FUERDA TECHNOLOGY CO., LTD., Suzhou (CN)

( * ) Notice: Subject to any disclaimer, the term of this patent is extended or adjusted under 35 U.S.C. 154(b) by 6 days.

(21) Appl. No.: 18/518,913

(22) Filed: Nov. 24, 2023

(65) Prior Publication Data
US 2025/0043880 A1 Feb. 6, 2025

(30) Foreign Application Priority Data

Jul. 31, 2023 (CN) .......................... 202310946349.3

(51) Int. Cl.
*F16K 31/00* (2006.01)
*F16K 1/36* (2006.01)
*F16K 1/42* (2006.01)

(52) U.S. Cl.
CPC .............. *F16K 31/002* (2013.01); *F16K 1/36* (2013.01); *F16K 1/42* (2013.01)

(58) Field of Classification Search
CPC .............. F16K 31/002; F16K 1/36; F16K 1/42
See application file for complete search history.

(56) References Cited

U.S. PATENT DOCUMENTS

| | | | | |
|---|---|---|---|---|
| 3,229,956 | A | * | 1/1966 | White .................. F16K 31/025 236/48 R |
| 3,639,083 | A | * | 2/1972 | Romerhaus ............. F04C 28/06 417/282 |
| 5,325,880 | A | * | 7/1994 | Johnson .............. F16K 99/0038 60/528 |
| 5,595,214 | A | * | 1/1997 | Shaffer ................. F16D 43/284 137/513.5 |
| 5,655,898 | A | * | 8/1997 | Hashimoto ......... F04B 39/1073 137/856 |
| 6,120,408 | A | * | 9/2000 | Yates, III ................ F16H 48/08 192/82 T |
| 2002/0013555 | A1 | * | 1/2002 | Seward ............... F16K 99/0057 251/129.01 |
| 2014/0209180 | A1 | * | 7/2014 | Boyer .................. F16D 35/023 137/15.01 |
| 2016/0047482 | A1 | * | 2/2016 | Kuhnekath ......... F04B 53/1085 137/565.01 |

* cited by examiner

*Primary Examiner* — Patrick C Williams
(74) *Attorney, Agent, or Firm* — Westbridge IP LLC

(57) ABSTRACT

A temperature control regulating valve includes a mounting seat and a valve disc set on the end face of the mounting seat. The mounting seat is provided with a valve hole that penetrates through the mounting seat. The end of the valve disc close to the valve hole is slidably set relative to the valve hole, sliding with temperature changes. The structure of the temperature control regulating valve is simple. With temperature changes, the valve disc deforms, gradually changing its relative position to the valve hole, gradually blocking the valve hole or gradually overlapping the valve disc hole with the valve hole, allowing for a gradual change in the cross-sectional area through which fluid can pass, automatically adjusting the flow rate of the fluid with temperature changes.

9 Claims, 11 Drawing Sheets

TEMPERATURE CONTROL REGULATING VALVE AND APPLICATION THEREOF

CROSS-REFERENCE TO RELATED APPLICATIONS

This application claims priority to Chinese Patent Application No. 202310946349.3, filed on Jul. 31, 2023, the content of which is incorporated herein by reference in its entirety.

TECHNICAL FIELD

The present application relates to the technical field of valves, particularly to a temperature control regulating valve and its application.

BACKGROUND

Regulating valves, which regulate fluid flow by changing the flow passage area, include manual regulating valves and automatic regulating valves. Automatic regulating valves adjust the valve opening based on control signals from an automation system, thereby achieving regulation of fluid flow, pressure, and liquid level. Automatic regulating valves consist of a valve body and an actuator system, and may also require monitoring devices such as temperature sensors. However, they have a complex structure and large size, making them unsuitable for small-scale equipment. On the other hand, manual regulating valves require manual adjustment, resulting in disadvantages such as delayed response and low precision.

SUMMARY

The purpose of the present application is to provide a temperature control regulating valve and its application to overcome the deficiencies in the prior art.

To achieve the above purpose, the present application provides the following technical solution.

The present application discloses a temperature control regulating valve, comprising a mounting seat and a valve disc set on the end face of the mounting seat. The mounting seat has a valve hole, which penetrates through the mounting seat. The valve disc is arranged to slide relative to the valve hole with temperature changes at one end close to the valve hole.

Furthermore, in the above-mentioned temperature control regulating valve, the valve disc includes a mounting plate, a sliding plate, and a first connecting member and a second connecting member respectively connected between the mounting plate and the sliding plate. The mounting plate is fixed to the end face of the mounting seat, and the thermal expansion and contraction coefficient of the first connecting member is greater than or less than that of the second connecting member.

Furthermore, in the above-mentioned temperature control regulating valve, a valve disc hole corresponding to the valve hole is provided inside the valve disc.

Furthermore, in the above-mentioned temperature control regulating valve, the valve disc is made of a thermal expansion and contraction material sensitive to temperature, and one end of the valve disc opposite to the valve hole is fixed to the mounting seat.

Furthermore, in the above-mentioned temperature control regulating valve, the end face of the mounting seat is provided with a groove corresponding to the valve disc, and the valve hole communicates with the groove.

Furthermore, in the above-mentioned temperature control regulating valve, the valve disc is hinged to the end face of the mounting seat, and one end of the valve disc opposite to the valve hole is connected with a driving device that drives it to swing.

Furthermore, in the above-mentioned temperature control regulating valve, the driving device is a driving plate made of a thermal expansion and contraction material sensitive to temperature, and both ends of the driving plate are respectively hinged to the valve disc and the mounting seat.

Furthermore, in the above-mentioned temperature control regulating valve, the valve disc is of a roll structure, and one end of the valve disc is fixed to the mounting seat.

The present application also discloses a piston comprising a piston body, one end of which is provided with the above-mentioned temperature control regulating valve, and a flow passage communicating with the valve hole is provided inside the piston.

The present application also discloses a door closer comprising the above-mentioned piston.

Compared with the prior art, the temperature control regulating valve of the present application has a simple structure. With temperature changes, the valve disc deforms, and its relative position to the valve hole gradually changes. The valve hole is gradually blocked or the valve disc hole gradually coincides with the valve hole, allowing the cross-sectional area of the fluid flow to gradually change, and the fluid flow is automatically regulated with temperature changes.

BRIEF DESCRIPTION OF THE DRAWINGS

To provide a clearer explanation of the embodiments or technical solutions in the present application, a brief introduction will be given to the accompanying drawings used in the embodiments or the description of the prior art. The accompanying drawings described below are merely some embodiments recorded in the present application, and ordinary skilled persons in the art can obtain other accompanying drawings based on these drawings without exercising inventive labor.

DETAILED DESCRIPTION OF THE EMBODIMENTS

Figure 1:
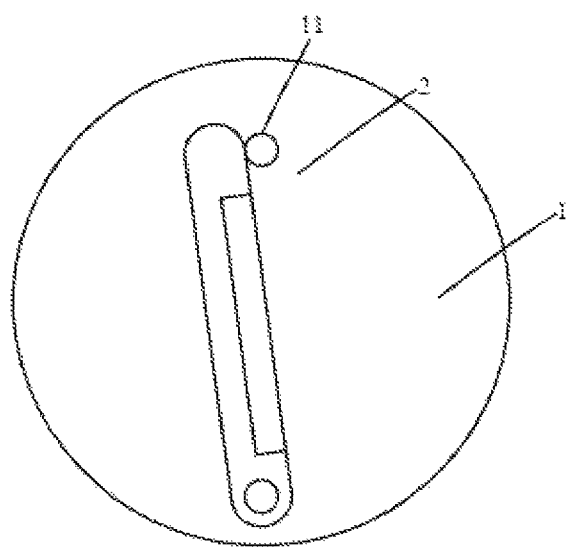
FIG. 1 shows the schematic diagram of the temperature control regulating valve structure in embodiment one according to the present application.

The following will describe in detail the technical solutions in the embodiments of the present application in conjunction with the accompanying drawings. The described embodiments are only a part of the embodiments of the present application, not all of them. Based on the embodiments of the present application, all other embodiments obtained by those skilled in the art without inventive labor are within the scope of the present application.

In the description of the present application, it should be noted that the terms "center," "up," "down," "left." "right," "vertical," "horizontal," "inner," "outer," and the like indicating the orientation or positional relationship are based on the orientation or positional relationship shown in the accompanying drawings, and are only for the convenience of describing the present application and simplifying the description, and do not indicate or imply that the device or element referred to must have a specific orientation, be constructed and operated in a specific orientation. Therefore, it should not be understood as limiting the present application. In addition, the terms "first," "second," and "third" are used for descriptive purposes only and should not be understood as indicating or implying relative importance.

In the description of the present application, it should be noted that unless otherwise expressly specified and limited, the terms "installation," "connection," and "linking" should be broadly understood, for example, they can be fixed connections or detachable connections, or integral connections; they can be mechanical connections or electrical connections; they can be directly connected or indirectly connected through intermediate media; they can be internal connections between two components. For those skilled in the art, the specific meanings of the above terms in the present application can be understood according to specific circumstances.

Referring to FIGS. 1 to 20, a temperature control regulating valve is provided, including an installation seat 1 and a valve disc 2 disposed on an end face of the installation seat 1. A valve hole 11 is provided inside the installation seat 1, and the valve hole 11 penetrates the installation seat 1. The valve disc 2 is slidably disposed relative to the valve hole 11 and moves with temperature changes.

In this technical solution, the shape of the valve hole is not required, as long as it allows fluid to pass through. As the valve disc slides relative to the valve hole with temperature changes, the cross-sectional area through which fluid can pass also changes. With temperature changes, the fluid flow automatically adjusts. The valve disc is set on one side end face of the installation seat, and when hydraulic oil or other fluid flows from the side where the valve disc is located towards the temperature control regulating valve, the valve disc fits against the surface of the installation seat, and the fluid is blocked by the valve disc or the flow rate changes with the deformation of the valve disc. When the fluid changes direction, that is, when it flows from the side opposite to the valve disc towards the temperature control regulating valve, the fluid flows along the valve hole towards the valve disc and impacts the valve disc, causing it to lift up and directly regulate the flow rate. Two valve discs are respectively set at both ends of the valve hole, and the two valve discs slide in the same direction or the opposite direction. The first valve disc regulates the flow rate when the fluid passes through, while the second valve disc is lifted by the impact, without affecting the flow rate. When the fluid changes direction, the functions of the two valve discs are exchanged, and the flow rate is also adjusted with temperature changes.

Embodiment 1

Figure 2:
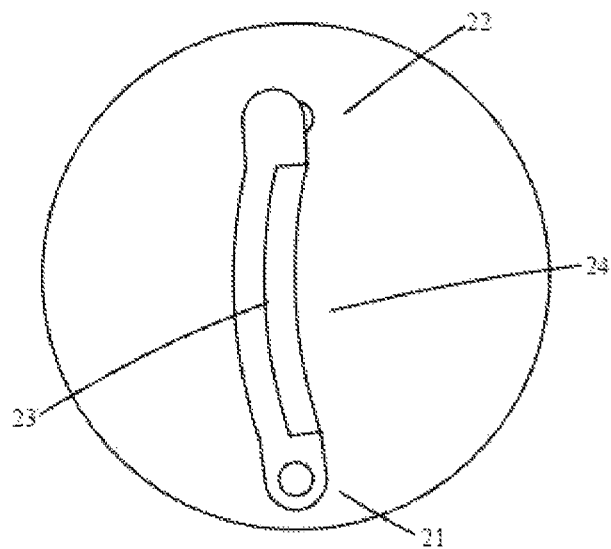
FIG. 2 shows the state diagram of the temperature control regulating valve after the deformation of the valve disc in embodiment one according to the present application.
Figure 3:
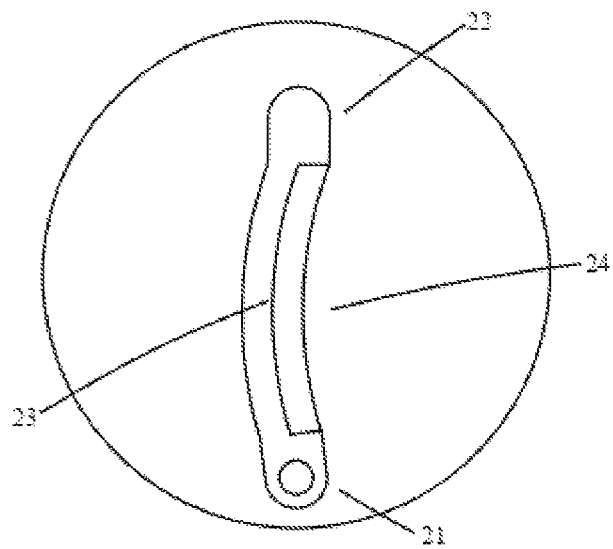
FIG. 3 shows the state diagram of the temperature control regulating valve after the valve disc seals the valve hole in embodiment one according to the present application.

Illustratively, as shown in FIGS. 1 to 3, the valve disc 2 includes an installation piece 21, a sliding piece 22, a first connecting member 23, and a second connecting member 24, which are respectively connected between the installation piece 21 and the sliding piece 22. The installation piece 21 is fixed to the end face of the installation seat 1. The thermal expansion and contraction coefficient of the first connecting member 23 is greater than or less than the thermal expansion and contraction coefficient of the second connecting member 24.

In this technical solution, the installation piece is fixed to the end face of the installation seat through processes such as riveting. When the temperature changes, the different thermal expansion and contraction coefficients of the first and second connecting members cause different deformations, resulting in the bending of the first and second connecting members and swinging of the sliding piece. During the swinging of the sliding piece, the valve hole is gradually blocked. The first and second connecting members can be in the form of sheets or wires, and can undergo overall bending or deformation during temperature changes. In the initial state, the valve disc blocks the valve hole, and after the temperature changes, the valve disc gradually moves away from the valve hole. In the initial state, the valve disc and the valve hole are set to be staggered, and after the temperature changes, the valve disc gradually moves closer to the valve hole until it completely blocks the valve hole. The swinging direction of the sliding piece is determined by the position and thermal expansion and contraction coefficients of the first and second connecting members. The first connecting member is set to the left of the second connecting member, and the thermal expansion and contraction coefficient of the first connecting member is smaller than that of the second connecting member. When the temperature decreases, the contraction of the second connecting member is greater than that of the first connecting member, causing the sliding piece to swing to the side where the second connecting member is located.

Embodiment 2

Figure 4:
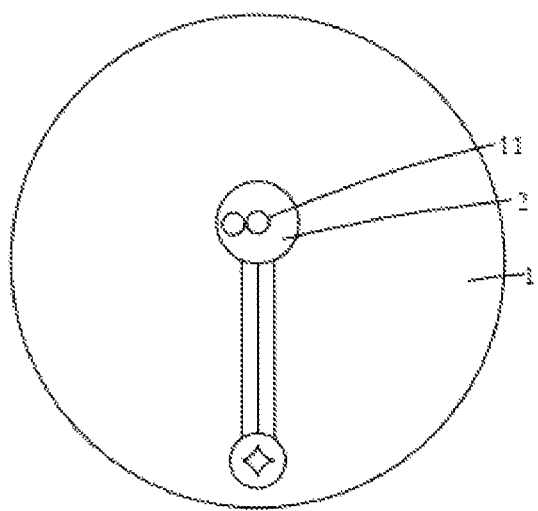
FIG. 4 shows the schematic diagram of the temperature control regulating valve structure in embodiment two according to the present application.
Figure 5:
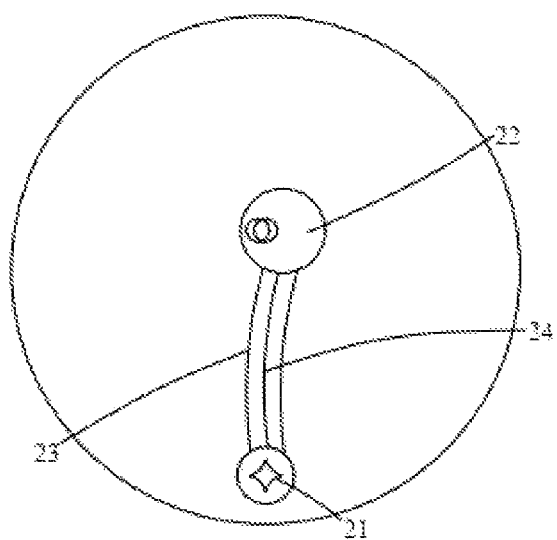
FIG. 5 shows the state diagram of the temperature control regulating valve with deformation of the valve disc in embodiment two according to the present application.
Figure 6:
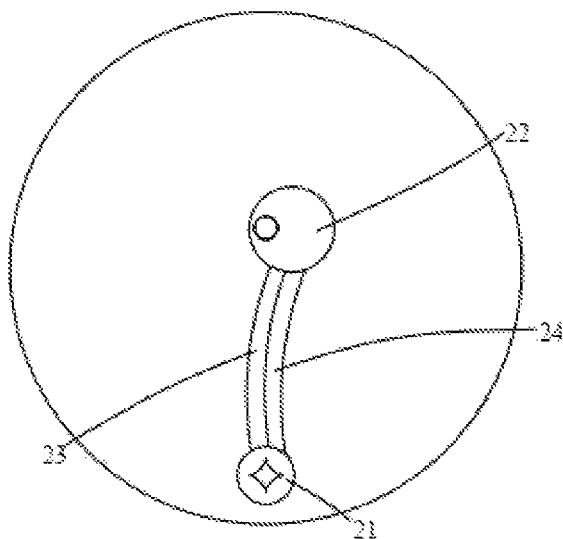
FIG. 6 shows the state diagram of the temperature control regulating valve when the valve disc hole coincides with the valve hole in embodiment two according to the present application.
Figure 7:
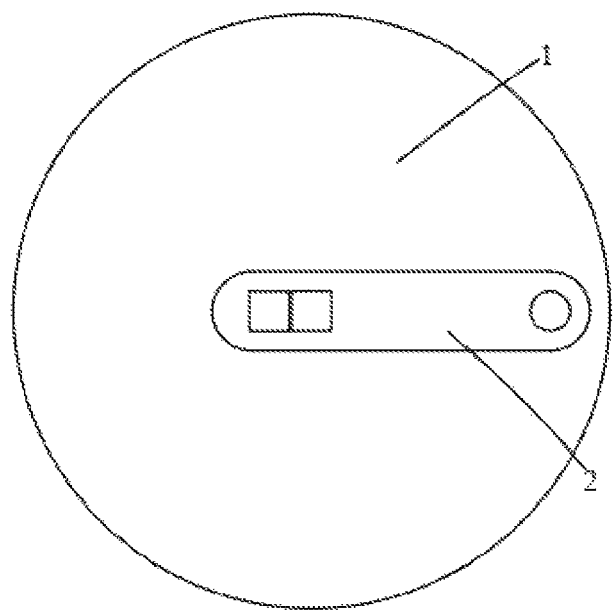
FIG. 7 shows the schematic diagram of the temperature control regulating valve structure in embodiment three according to the present application.

Illustratively, as shown in FIGS. 4 to 6, different from embodiment 1, the sliding piece 22 is internally provided with a valve disc hole corresponding to the valve hole, and the area of overlap between the valve disc hole and the valve hole 11 changes with the sliding of the sliding piece.

In this technical solution, the installation piece is fixed to the end face of the installation seat through processes such as riveting. When the temperature changes, the different thermal expansion and contraction coefficients of the first and second connecting members cause different deformations, resulting in the bending of the first and second connecting members and swinging of the sliding piece. During the swinging of the sliding piece, the valve disc hole moves relative to the valve hole. The first and second connecting members can be in the form of sheets or wires, and can undergo overall bending or deformation during temperature changes. In the initial state, the valve disc hole overlaps with the valve hole, and after the temperature changes, the valve disc hole gradually moves away from the valve hole. In the initial state, the valve disc hole and the valve hole are set to be staggered, and after the temperature changes, the valve disc hole gradually moves closer to the valve hole. The swinging direction of the sliding piece is determined by the position and thermal expansion and contraction coefficients of the first and second connecting members. The first connecting member is set to the left of the second connecting member, and the thermal expansion and contraction coefficient of the first connecting member is smaller than that of the second connecting member. When the temperature decreases, the contraction of the second connecting member is greater than that of the first connecting member, causing the sliding piece to swing to the side where the second connecting member is located.

Illustratively, as shown in FIGS. 1 to 6, the installation piece 21 and the sliding piece 22 are integrally formed with the first connecting member 23 or the second connecting member 24.

In this technical solution, the installation piece and the sliding piece are integrally formed with the first connecting member through processes such as stamping, and then the two ends of the second connecting member are fixed to the corresponding positions of the installation piece and the sliding piece through conventional processes such as welding or rolling. Alternatively, the installation piece and the sliding piece can also be integrally formed with the second connecting member, and the first connecting member is fixed through processes such as welding or rolling. The installation piece is internally provided with rivet holes, and is hinged to the installation seat through conventional rivets. The installation piece, sliding piece, first connecting member, and second connecting member can also be separately processed and formed, and are mutually fixed and connected through conventional processes such as welding or rolling.

Embodiment 3

Illustratively, as shown in FIGS. 7 to 10, the valve disc 2 is made of a temperature-sensitive thermal expansion and contraction material, and one end of it is fixed to the installation seat 1, away from the valve hole.

In this technical solution, the valve disc is made of conventional high-expansion alloys or materials with high expansion, such as nylon. With temperature changes, the valve disc elongates or contracts, gradually changing the relative position between the valve disc hole and the valve hole or the area of the valve disc blocking the valve hole. This allows for a gradual change in the cross-sectional area through which fluid can pass, automatically adjusting the flow rate of the fluid with temperature changes.

Illustratively, as shown in FIGS. 4 to 7, the end face of the installation seat 1 is provided with a groove corresponding to the valve disc 2, and the valve hole 11 communicates with the groove.

In this technical solution, the end face of the installation seat is concavely provided with a waist-shaped groove. One end near its outer edge is connected to the valve disc through rivets or screws, and the other end is connected to the valve hole. The groove restricts the deformation direction of the valve disc, allowing it to expand and contract along the length direction of the groove as much as possible.

Embodiment 4

Figure 11:
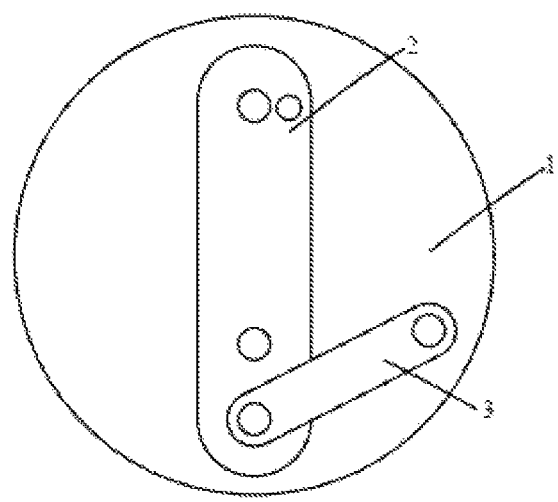
FIG. 11 shows the sectional view of the temperature control regulating valve in embodiment four according to the present application.
Figure 12:
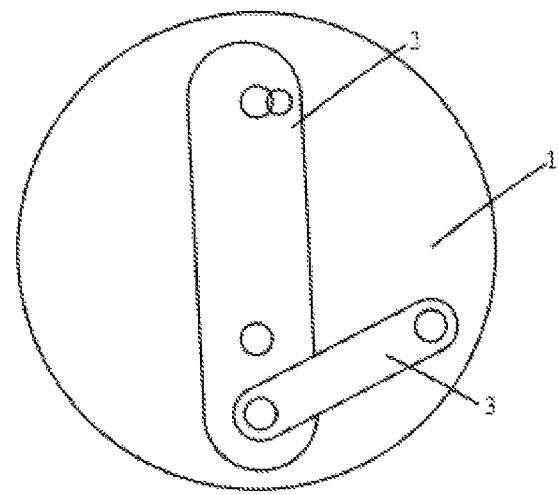
FIG. 12 shows the state diagram of the temperature control regulating valve with deformation of the valve disc in embodiment four according to the present application.
Figure 13:
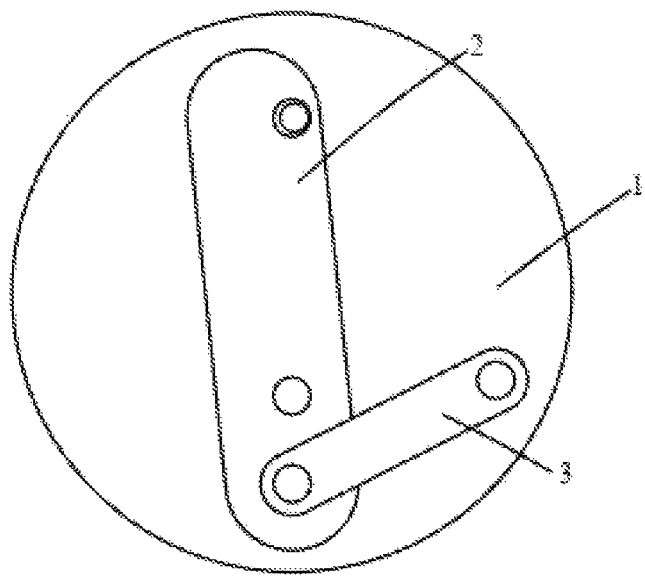
FIG. 13 shows the state diagram of the temperature control regulating valve when the valve disc hole coincides with the valve hole in embodiment four according to the present application.

Illustratively, as shown in FIGS. 11 to 13, the valve disc 2 is hinged to the end face of the installation seat 1, and one end away from the valve hole 11 is connected to a driving device 3 that drives its swinging motion.

In this technical solution, both the valve disc and the installation seat are made of low-expansion materials, and the driving device is made of a high-expansion material that is sensitive to temperature changes. When the temperature changes, the driving device drives the valve disc to swing, changing the overlapping area between the valve disc hole and the valve hole or changing the area of the valve disc blocking the valve hole. This allows for a gradual change in the cross-sectional area through which fluid can pass, automatically adjusting the flow rate of the fluid with temperature changes.

Figure 8:
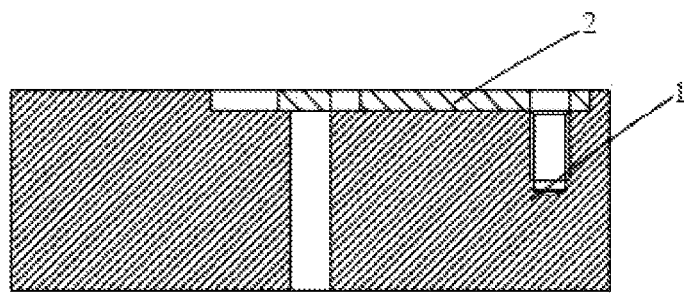
FIG. 8 shows the sectional view of the temperature control regulating valve in embodiment three according to the present application.
Figure 9:
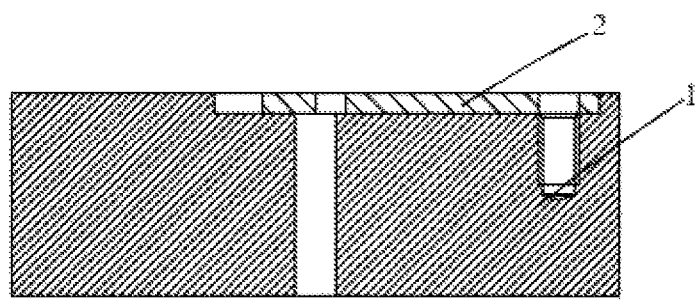
FIG. 9 shows the state diagram of the temperature control regulating valve with deformation of the valve disc in embodiment three according to the present application.
Figure 10:
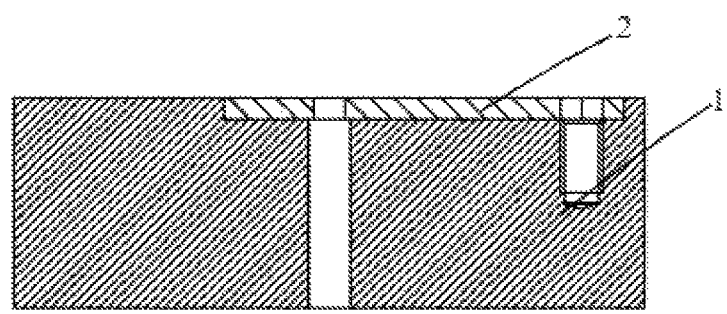
FIG. 10 shows the state diagram of the temperature control regulating valve when the valve disc hole coincides with the valve hole in embodiment three according to the present application.

Illustratively, as shown in FIGS. 8 to 10, the driving device is a driving piece made of a temperature-sensitive thermal expansion and contraction material, and its two ends are hinged to the valve disc 2 and the installation seat 1, respectively.

In this technical solution, the driving piece is made of conventional high-expansion alloys or materials with high expansion, such as nylon. With temperature changes, the driving piece elongates or contracts, driving the valve disc to swing and changing the overlapping area between the valve disc hole and the valve hole or changing the area of the valve disc blocking the valve hole. This allows for a gradual change in the cross-sectional area through which fluid can pass, automatically adjusting the flow rate of the fluid with temperature changes.

Embodiment 5

Figure 14:
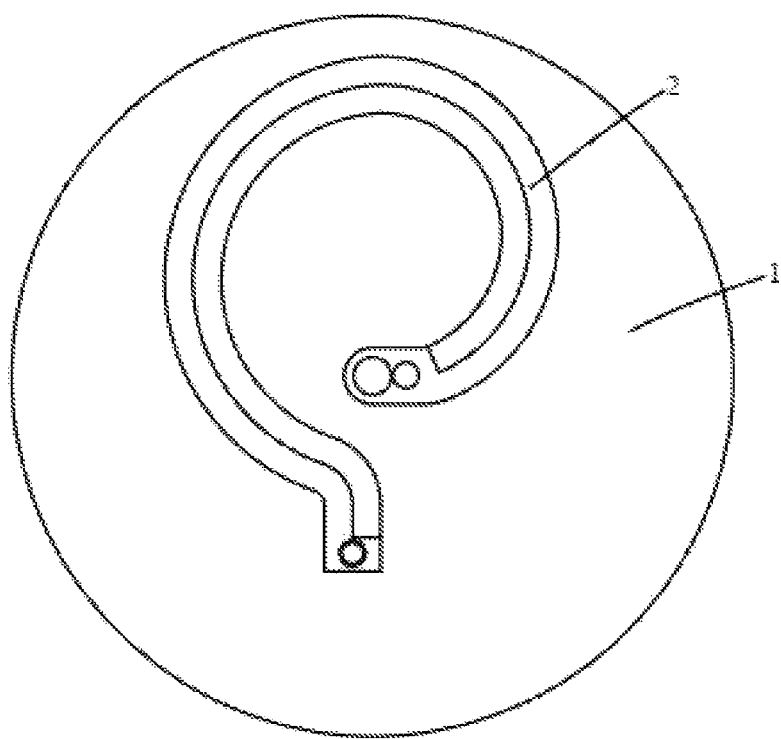
FIG. 14 shows the sectional view of the temperature control regulating valve in embodiment five according to the present application.
Figure 15:
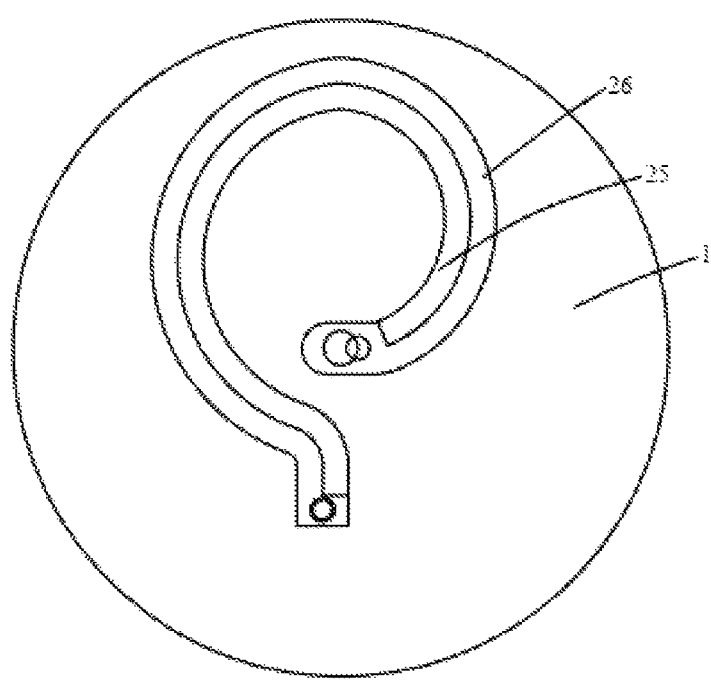
FIG. 15 shows the state diagram of the temperature control regulating valve with deformation of the valve disc in embodiment five according to the present application.
Figure 16:
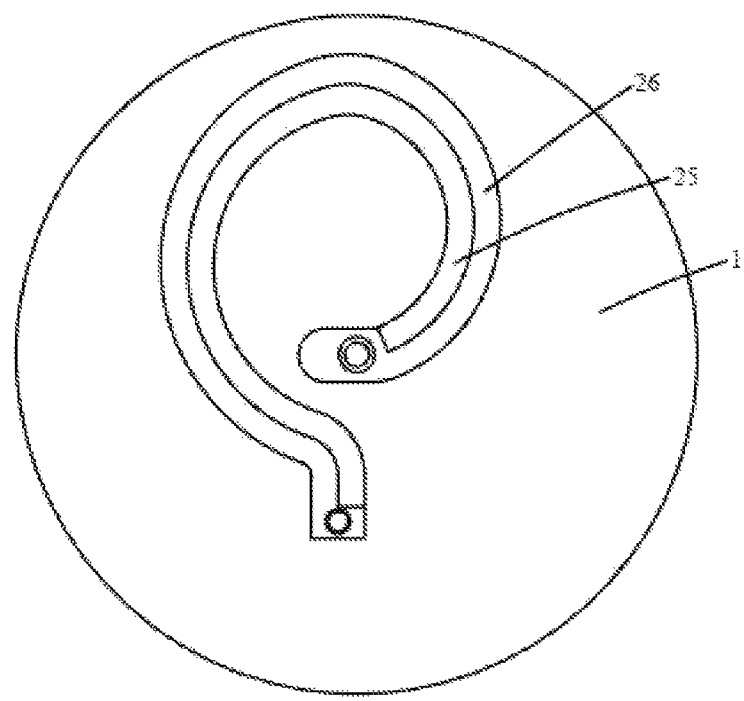
FIG. 16 shows the state diagram of the temperature control regulating valve when the valve disc hole coincides with the valve hole in embodiment five according to the present application.

Illustratively, as shown in FIGS. 14 to 16, the valve disc 2 is an elastic coil, consisting of an inner connecting member 25 and an outer connecting member 26 with different thermal expansion and contraction coefficients. The inner end of the valve disc is positioned near the valve hole 11, while the outer end is fixed to the installation seat.

In this technical solution, the elastic coil is made of inner metal sheets and outer metal sheets with different thermal expansion and contraction coefficients. The two ends of the outer metal sheets protrude from the ends of the inner metal sheets, forming an installation boss and a sliding boss. The installation boss and the sliding boss can also be independently set and fixed through conventional processes such as riveting. The installation boss at the outer end of the outer metal sheets is fixed to the end face of the installation seat, while the sliding boss at the inner end of the outer metal sheets is positioned near the valve hole. When the temperature changes, the different thermal expansion and contraction coefficients of the inner and outer metal sheets result in different amounts of deformation, causing the elastic coil to contract or loosen, thus changing the overlapping area between the valve disc hole and the valve hole or changing the area of the sliding boss blocking the valve hole. This allows for a gradual change in the cross-sectional area through which fluid can pass, automatically adjusting the flow rate of the fluid with temperature changes. The valve disc can also be made of a single temperature-sensitive thermal expansion and contraction material, which has a smaller amount of deformation compared to the dual-layer material during temperature changes, thus providing higher precision for flow rate adjustment. This can be used in applications requiring high precision, such as experimental equipment. The valve disc can also be made of three or more layers of materials with different thermal expansion and contraction coefficients.

Embodiment 6

Figure 17:
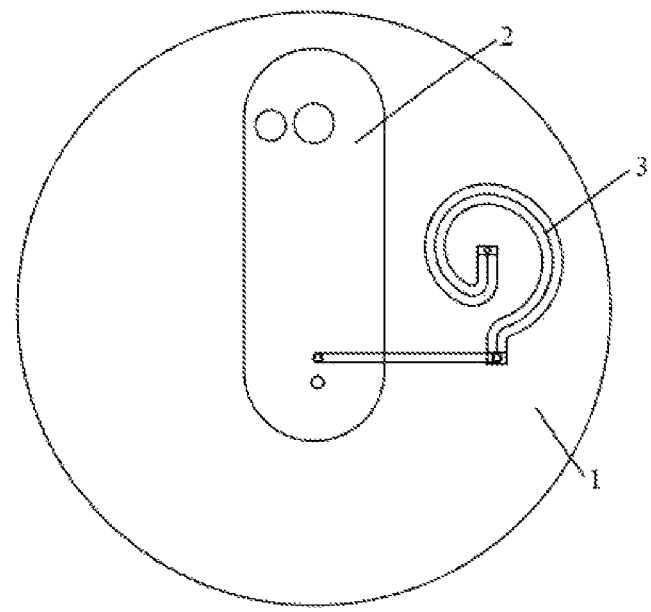
FIG. 17 shows the sectional view of the temperature control regulating valve in embodiment six according to the present application.
Figure 18:
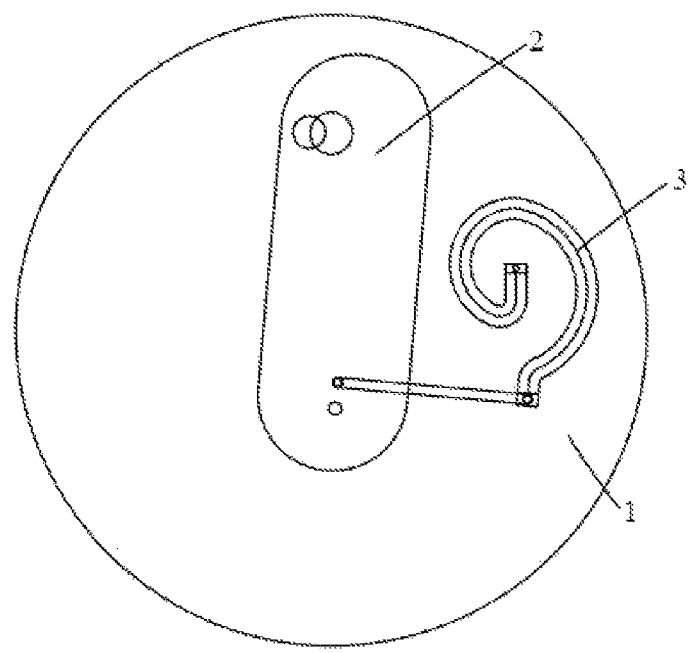
FIG. 18 shows the state diagram of the temperature control regulating valve with deformation of the valve disc in embodiment six according to the present application.
Figure 19:
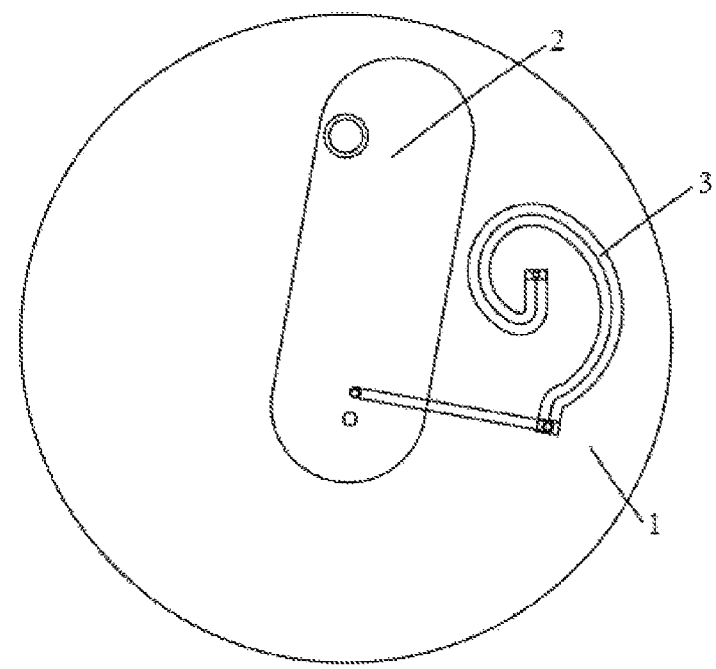
FIG. 19 shows the state diagram of the temperature control regulating valve when the valve disc hole coincides with the valve hole in embodiment six according to the present application.

As shown in FIGS. 17 to 19, in contrast to Embodiment 4, the driving device is an elastic coil and is connected to one end of the valve disc through a conventional linkage structure. During the contraction or loosening of the elastic coil, the valve disc is driven to swing around the riveting point between the valve disc and the installation seat, changing the overlapping area between the valve disc hole and the valve hole or changing the area of the sliding boss blocking the valve hole. This allows for a gradual change in the cross-sectional area through which fluid can pass, automatically adjusting the flow rate of the fluid with temperature changes.

Embodiment 7

Figure 20:
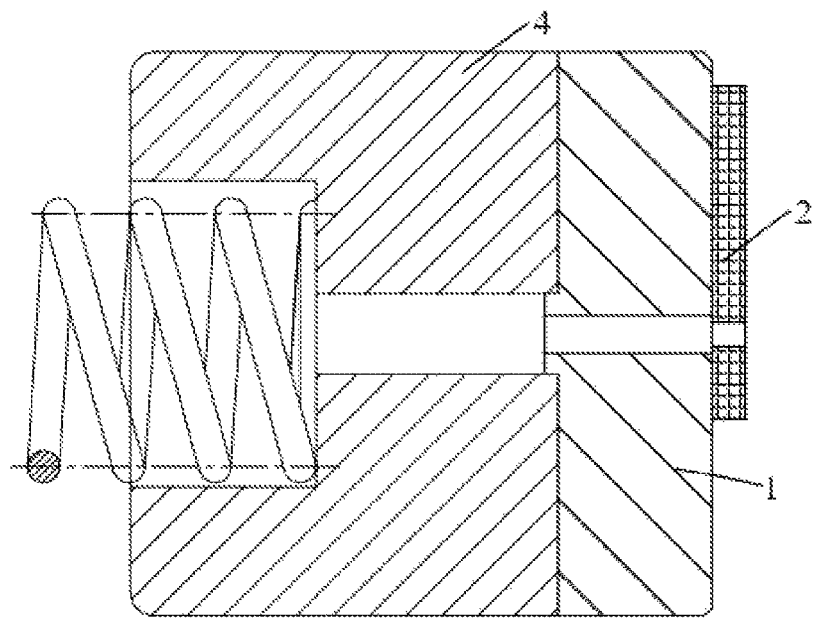
FIG. 20 shows the schematic diagram of the piston structure in embodiment seven according to the present application.

Illustratively, as shown in FIG. 20, a piston is provided, comprising a piston body 4. One end of the piston body 4 is connected to the temperature control regulating valve described above through methods such as threaded connection, bolt connection, or welding. The piston body 4 is internally provided with a flow passage communicating with the valve hole 11. The temperature control regulating valve is fixed to one end away from the spring using bolts or other means. The contact surface between the temperature control regulating valve and the piston body adopts conventional techniques such as a stepped structure or sealing ring to ensure sealing and prevent hydraulic oil leakage from the connection between the temperature control regulating valve and the piston body. The installation seat of the temperature control regulating valve can also be integrated with the piston body. During opening, the piston body compresses the spring, reducing the space on the side where the spring is located, and the hydraulic oil flows to the side away from the spring, pressing against the valve disc, causing its elastic deformation and ensuring smooth flow of the hydraulic oil. During closing, the spring releases elastic potential energy, pushing the piston to reset, and the hydraulic oil flows to the side where the spring is located, pressing and fitting the valve disc against the end face of the installation seat, thereby blocking the valve hole and forming a one-way flow passage. The hydraulic oil flows back along the return oil passage of the door closer. As the external ambient temperature decreases, the viscosity of the hydraulic oil gradually increases, causing deformation of the valve disc, which in turn moves the valve disc hole relative to the valve hole. The valve disc hole gradually overlaps with the valve hole, allowing for a gradual change in the cross-sectional area through which fluid can pass, automatically adjusting the flow rate of the fluid with temperature changes, compensating for the decrease in flow velocity in the return oil passage due to the increased viscosity of the hydraulic oil, and ensuring the closing speed.

Embodiment 8

A door closer, comprising the piston as described above, can ensure the closing speed even in extreme cold weather or in low-temperature regions in the north, without affecting normal use at room temperature, and no manual adjustment is required.

In summary, the structure of the temperature control regulating valve is simple. With temperature changes, the valve disc deforms, gradually changing its relative position to the valve hole, gradually blocking the valve hole or gradually overlapping the valve disc hole with the valve hole, allowing for a gradual change in the cross-sectional area through which fluid can pass, automatically adjusting the flow rate of the fluid with temperature changes. With the door closer utilizing the piston, the closing speed can be ensured even in extreme cold weather or in low-temperature regions in the north, without affecting normal use at room temperature, and no manual adjustment is required.

It should be noted that in this document, terms such as "first" and "second" are used merely to distinguish one entity or operation from another, and do not necessarily imply any actual relationship or order between these entities or operations. Additionally, terms such as "comprising," "including," or any other variants thereof are intended to encompass non-exclusive inclusion, such that processes, methods, articles, or devices comprising a series of elements also include other elements not explicitly listed, or include additional elements inherent to such processes, methods, articles, or devices. Unless specifically limited, statements such as "including one . . . " do not exclude the presence of additional identical elements in processes, methods, articles, or devices including the specified elements.

The above description is only specific embodiments of the present application. It should be pointed out that for those skilled in the art of this technical field, various improvements and modifications can be made without departing from the principles of the present application, and these improvements and modifications should also be considered within the scope of the present application.

What is claimed is:

1. A temperature control regulating valve used in a door closer, comprising a mounting seat and a valve disc set on an end face of the mounting seat, wherein the mounting seat is provided with a valve hole that penetrates through the mounting seat;

one end of the valve disc close to the valve hole is provided to automatic slide on an end face of the mounting seat in response to temperature changes, thereby enabling sliding relative to the valve hole;

the valve disc is provided on both the end of the valve hole, and two valve discs slide in a same direction or opposite directions.

2. The temperature control regulating valve according to claim 1, wherein the valve disc includes a mounting piece, a sliding piece, a first connecting piece, and a second connecting piece respectively connecting the mounting piece and the sliding piece, the mounting piece is fixed to the end face of the mounting seat, and thermal expansion and contraction coefficient of the first connecting piece is greater than or less than that of the second connecting piece.

3. The temperature control regulating valve according to claim 1, wherein the valve disc is provided with a valve disc hole corresponding to the valve hole.

4. The temperature control regulating valve according to claim 1, wherein the valve disc is made of a temperature-sensitive thermal expansion and contraction material and one end thereof opposite to the valve hole is fixed to the mounting seat.

5. The temperature control regulating valve according to claim 4, wherein the end face of the mounting seat is provided with a groove corresponding to the valve disc, and the valve hole communicates with the groove.

6. The temperature control regulating valve according to claim 1, wherein the valve disc is hinged to the end face of the mounting seat, and one end thereof opposite to the valve hole is connected to a driving device that drives its swinging motion.

7. The temperature control regulating valve according to claim 6, wherein the driving device is a driving piece made of a temperature-sensitive thermal expansion and contraction material, and both ends of the driving piece are respectively hinged to the valve disc and the mounting seat.

8. The temperature control regulating valve according to claim 1, wherein the valve disc is of a coiled structure, and one end thereof is fixed to the mounting seat.

9. A piston, comprising a piston body, wherein one end of the piston body is provided with the temperature control regulating valve according to claim 1, and a flow channel communicating with the valve hole is provided inside the piston body.

* * * * *